J. B. WINTERS.
Car-Coupling.

No. 159,372.

Patented Feb. 2, 1875.

WITNESSES:

INVENTOR:
J. B. Winters
BY
ATTORNEYS.

THE GRAPHIC CO.PHOTO-LITH.39 & 41 PARK PLACE, N.Y.

UNITED STATES PATENT OFFICE.

JOHN B. WINTERS, OF ATTICA, MICHIGAN.

IMPROVEMENT IN CAR-COUPLINGS.

Specification forming part of Letters Patent No. 159,372, dated February 2, 1875; application filed December 19, 1874.

*To all whom it may concern:*

Be it known that I, JOHN B. WINTERS, of Attica, in the county of Lapeer and State of Michigan, have invented a new and Improved Car-Coupling, of which the following is a specification:

The invention is an improvement in the class of couplings wherein a pivoted hook is arranged within a draw-head, and acted upon by a spring, which enables it to operate automatically for connecting with the coupling-link. The improvement relates to the construction and arrangement of the means for releasing the hook from the link, and for holding them (said means) out of engagement therewith, as hereinafter described.

Figure 1:
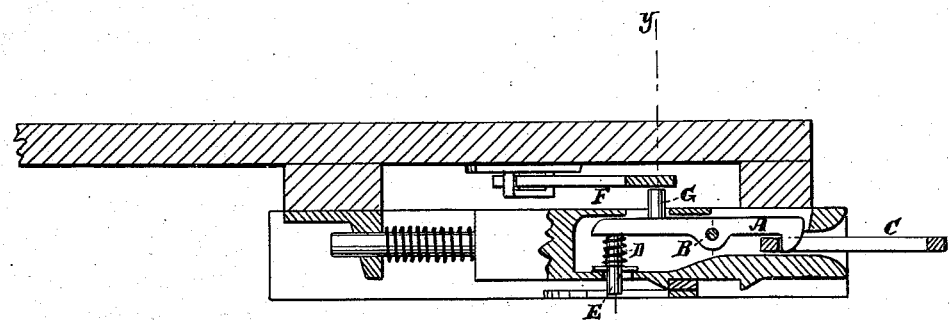
Figure 2:
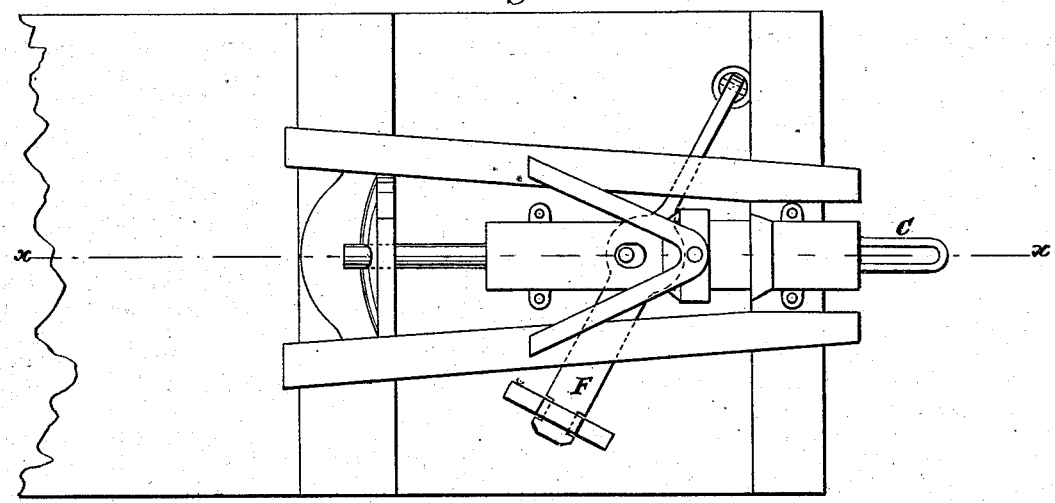
Figure 3:
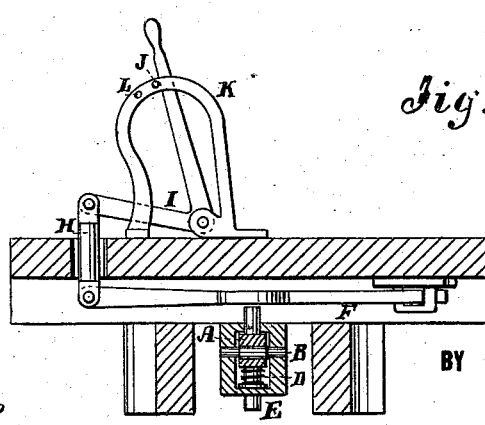

Figure 1 is a longitudinal sectional elevation of the coupling, taken on the line $x\ x$ of Fig. 2. Fig. 2 is a plan of the coupling inverted; and Fig. 3 is a transverse section, taken on the line $y\ y$ of Fig. 1.

Similar letters of reference indicate corresponding parts.

A is the coupling-hook, which is fixed on a pivot, B, to swing up and down in connecting and disconnecting with the link C, and it has a spring, D, on a guide-pin, E, for holding it when coupled with the link. F is the lever for car-coupling by pressing down on the push-pin G on the rear part of the hook. It is connected by the rod H with the cranked lever I on the platform for being worked by it, said lever being pushed to the left to uncouple, and it is held back by a pin in the hole J of the stands K when the hook is coupled, and it is held forward to keep the hook raised for the escape of the link by a pin in hole L of said stand. The arrangement is simple and cheap, and it is believed will be easier and more convenient to operate than others.

I do not claim, broadly, acting upon a coupling-hook to release it from the link by means of a lever; but

Having thus described my invention, I claim as new and desire to secure by Letters Patent—

The elbow-lever I, platform-stand K, having holes J L to receive a locking-pin, the connecting-rod H and the lever F, extending horizontally beneath the platform, in combination with the pivoted link A, having the stud G and the spring D, all constructed as shown and described.

JOHN B. WINTERS.

Witnesses:
A. A. NICHOLS,
F. H. WINTERS.